The present invention relates to devices of magnetometers of the type described in the prior U.S. patent applications Ser. No. 725,746, filed on April 1, 1958, and now Patent No. 3,049,661 granted August 14, 1962, and Ser. No. 813,158, filed on May 14, 1959 and now Patent No. 3,049,662 granted August 14, 1962, in the names of Anatole Abragam, Jean Combrisson and Ionel Solomon, for the measurement of magnetic fields, even very small, making use, as element sensitive to the magnetic field to be measured, of a liquid sample consisting of a solution containing, on the one hand in the solvent, atomic nuclei having an angular momentum and a magnetic moment which are not equal to zero and, on the other hand dissolved in this solvent, a paramagnetic substance of hyperfine structure of the stationary or bound type, that is to say including at least one unpaired electron in S-state with respect to a nucleus of said paramagnetic substance (also having an angular momentum and a magnetic moment different from zero) and having a narrow electronic resonance line or band of a frequency different from zero even in a magnetic field equal to zero.

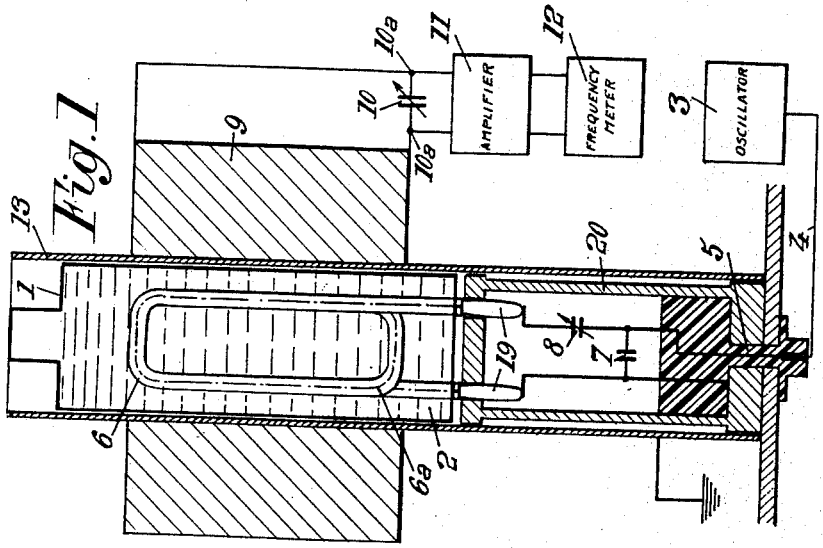
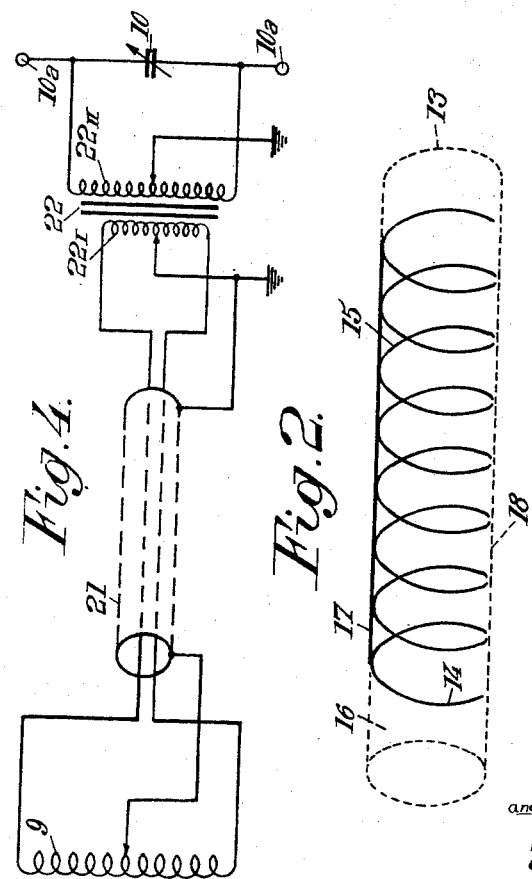
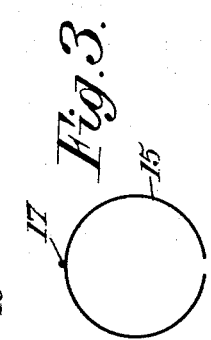
INVENTORS
GEORGES BONNET
and ANTOINE SALVI
ATTORNEY 3,166,706
MAGNETIC RESONANCE DEVICE FOR MEASURING MAGNETIC FIELD INTENSITY
Georges Bonnet, Grenoble, and Antoine Salvi, Saint-Egreve, France, assignors to Commissariat a l'Energie Atomique, Paris, France, an organization of France
Filed Dec. 11, 1959, Ser. No. 859,066
Claims priority, application France Dec. 16, 1958
8 Claims. (Cl. 324—.5)

An accurate measurement of magnetic fields is possible with such a sample:

First because the nuclear resonance frequency (also called "Lamor frequency") of the nuclei of the solvent is exactly proportional to the intensity or strength of the magnetic field;

And secondly because it was found that when solutions of such paramagnetic substances (such as metallic salts of the transition groups or free radicals) were subjected to the action of strong magnetic fields at the electronic resonance frequency of said paramagnetic substance, there was obtained an increase of the nuclear polarization of the solvent (consisting for instance of a liquid such as water containing protons), that is to say of the nuclear resonance macroscopic signal of this solvent;

The solution therefore emitting, when one of its electronic resonance lines is saturated, energy at the nuclear resonance frequency of the nuclei of the solvent, but with an increased intensity; the increase that is observed for the polarization of the atomic nuclei of the solvent is due to the fact that the unpaired paramagnetic electron is subjected not only to the action of the external magnetic field which may be very low (averaging 0.5 gauss in the case of the earth field) but to that of the field produced by the magnetic moment of a nucleus of said paramagnetic substance with which it is coupled by the hyperfine structure.

Furthermore, the proton polarization being negative in the case where a paramagnetic substance of the above mentioned type is used, their nuclear paramagnetic susceptibility is also negative, which permits the operation of the measurement device as an auto-oscillator of the "maser" type (microwave amplification by stimulated emission of radiation).

It was indicated in the above mentioned prior patent applications that, when some conditions concerning the sign of the magnetic moment were complied with, there was obtained an emission of energy by the atomic nuclei of the solvent at the nuclear resonance frequency thereof, instead of the usual energy absorption and FIGS. 4 and 5 of the first of said prior applications showed a device for measuring, without any frequency or magnetic field sweep, the intensity of magnetic fields (in particular of the earth magnetic field), this device, which is based upon such a spontaneous emission of energy, comprising means for saturating the electronic resonance frequency of the solution, means for collecting the energy emitted by said solution at the nuclear resonance frequnecy of the solvent nuclei and means for measuring the frequency of the energy thus collected, this frequency being, as above indicated, exactly proportional to the intensity of the magnetic field in which the solution is placed and the proportionality coefficient being accurately known (see for instance the table on pages 2249 to 2251 of the Handbook of Chemistry and Physics, Chemical Rubber Publishing Co., Cleveland, Ohio, which gives the nuclear frequencies, i.e. Larmor frequencies, in megacycles for fields of 10,000 gauss).

A device according to the above mentioned patent applications for the measurement of magnetic fields, making use of the spontaneous emission of energy at a frequency proportional to the magnetic field by a solution containing, on the one hand, atomic nuclei having an angular momentum and a magnetic moment different from zero and, on the other hand, a paramagnetic substance of the above mentioned type, essentially comprises:

(1) A container in which is placed the above mentioned solution, for instance a solution in water of nitrosodisulfonate (also called peroxylamine disulfonate);

(2) A high frequency circuit for saturating an electronic resonance line of said paramagnetic substance, this circuit being tuned to the frequency of said line (55 MHz. for nitrosodisulfonate in a field equal to zero or very weak) and including, on the one hand, a high frequency coil surrounding said container and a tuning capacitor and, on the other hand, an oscillator of the same high frequency for feeding current to said coil;

(3) A low frequency circuit for collecting the energy emitted by the solution at the nuclear resonance frequency of the solvent (2100 Hz. for the protons of the water in the earth field), this circuit, which includes a low frequency coil for collecting said energy and a tuning capacitor, being capable of being tuned to said frequency and having a very high qualtiy, or Q, factor so as to be able to work as an auto-oscillator or maser at this frequency;

(4) A measurement device (for instance of the decade counter type) for determining with high precision the oscillation frequency of the low frequency circuit, this frequency being proportional to the intensity of the field in which the container is placed.

The high frequency coil and the low frequency coil are generally disposed concentrically about the container where the solution is placed, for instance with their axes at right angles to the magnetic field to be measured and they do not include a ferromagnetic core.

Now, saturation of the electronic line requires a radio frequency magnetic field of relatively high intensity within the volume occupied by the liquid sample. This involves two difficulties:

(a) The close proximity of the two coils (low frequency and high frequency coils) produces a coupling between the two corresponding circuits, which is detrimental to a good operation of the low frequency circuit as an oscillator and introduces the risk of perturbing the nuclear resonance frequency measurement;

(b) Due to this coupling, only a portion of the magnetic energy stored up in the high frequency coil is used for saturating the electronic resonance line, the remainder being dissipated in the form of heat in the vicinity of the coil; it is therefore necessary to consume a great amount of power in the high frequency circuit to obtain a suitable polarization and the heating that results therefrom may be prejudicial to a good preservation of the paramagnetic substance dissolved in the liquid.

The main object of the present invention is to eliminate any coupling between the high frequency circuit and the low frequency circuit. Another object is a better utilization of the magnetic field supplied by the high frequency coil. The invention is also concerned with the possibility of using the same device for measuring magnetic fields having intensities which may vary within relatively wide ranges.

The invention therefore has for its object a device for measuring magnetic fields which includes, according to the above mentioned prior patent applications, a container in which is placed a solution consisting of a solvent containing atomic nuclei having an angular momentum and a magnetic moment different from zero and of a paramagnetic substance of the above mentioned type dissolved in said solvent, said solution emitting, when one of the electronic resonance lines of the paramagnetic substance is saturated, energy at the nuclear resonance frequency of said atomic nuclei, at least one high frequency coil disposed with respect to said container in such manner as to create therein a magnetic field when said coil is fed with electric energy, means for feeding said coil with electric energy at the frequency of said electronic resonance line so as to saturate said line, at least one low frequency coil disposed, with respect to said container, in such manner as to collect said energy at the nuclear resonance frequency, electric circuit elements connected with said low frequency coil so as to constitute, at said nuclear resonance frequency, an oscillating circuit of high Q factor and means for measuring the frequency of the energy collected by said low frequency coil, this device being characterized by the fact that it comprises, to prevent any substantial coupling between the high frequency coil and the low frequency coil, an electric shield, opaque to the transmission of energy at the frequency of said electronic resonance line but transparent to the transmission of energy at the nuclear resonance frequency, said shield consisting of a tubular element which is at least partly a conductor of electricity cut, on the one hand, substantially along a first generatrix and, on the other hand, in several planes substantially perpendicular to said generatrix, the conductor strips thus insulated by these two kinds of cuts being electrically connected to the ground substantially along a second generatrix of the tubular element, this second generatrix being advantageously in a position symmetrical of that of the first generatrix with respect to the axis of the tubular element.

As a matter of fact, it is known that a conductive shield eliminates magnetic coupling between the spaces on either side thereof at frequencies higher than a given limit which depends upon the geometrical characteristics of this shield. On the contrary, at frequencies much lower than this limit, the influence of the shield more or less decreases. It might appear that it suffices to interpose a metallic cylinder between the high frequency coil and the low frequency coil when they are concentric with each other to eliminate any interaction between the two circuits which respectively include these coils. But this is not the case due to the fact that parasitic current circulates in the shield. This is why the two above mentioned cuts are provided. We have found first that the longitudinal cut or slot along one generatrix has for its effect to eliminate detrimental eddy currents in the shield. However, in the case of the coils used in the device disclosed by the above mentioned prior patent applications, which have no ferromagnetic cores, a considerable lowering of the Q factor of the low frequency coil (prejudicial to the effective operation of the nuclear oscillator) is found to occur due to the fact that the magnetic induction flux which passes through the cross-section of the cylinder is not constant along the axis of the cylinder due to the dispersion of the induction lines of force and that the same is true of the electromotive force induced in the loop formed by every cross-section of the cylinder. Therefore, despite the provision of the longitudinal cut or slot, there is produced a system of longitudinal electric currents which induces energy losses. Now we have found that the supplementary cuts in planes perpendicular to the axis of the cylinder prevent the formation of such longitudinal currents.

On the other hand, according to another feature of the invention, in order to use in the best possible conditions the magnetic field created by the high frequency coil and further to reduce the power consumed in the high frequency circuit, this coil is placed inside the liquid sample acting as a detector, the turns of this coil being advantageously covered with a thick coating of a low loss dielectric substance, so as to reduce the losses by conduction in the liquid which surrounds said coil.

Finally, if it is desired to measure, by means of a single device according to the invention, magnetic fields of very different intensities or strengths or capable of varying within wide ranges, the low frequency coil has its output connected with a transmission coaxial cable and we dispose, between the output of this coaxial cable and the tuning capacitor belonging to the low frequency oscillating circuit and serving to tune this circuit to the nuclear resonance frequency of the liquid sample, a high quality transformer, the transformation ratio of which is such that the value of the inductance of the low frequency coil (connected with the primary winding of said transformer), such as it appears at the secondary winding of the transformer (connected with said capacitor) is capable of being tuned by a variable capacitor of conventional capacitance within the whole range of the frequencies corresponding to the intensities of the magnetic fields to be measured.

A preferred embodiment of the present invention and a modification thereof will be hereinafter described with reference to the accompanying drawings, given merely by way of example and in which:

FIG. 1 shows the construction of a device for measuring magnetic fields according to the invention, the probe containing the liquid sample sensitive to the intensity or strength of the magnetic field being shown in longitudinal section, whereas the electronic elements associated therewith are illustrated as block diagrams.

FIG. 2 is a perspective view of a shield used in the probe according to FIG. 1 and made according to an essential feature of the invention.

FIG. 3 shows in end view the shield of FIG. 2.

FIG. 4 shows a modified portion of the low frequency circuit of a magnetic field measurement device or magnetometer according to FIG. 1, the modification being especially adapted for the measurement of variable magnetic fields.

Referring first to FIG. 1, it will be seen that a device according to the invention for the measurement of magnetic fields includes, as described in the first mentioned prior patent application (FIGS. 4 and 5 thereof):

(1) A container 1 in which is placed a solution 2 consisting of a solvent, generally an ionizing one, which contains:

Atomic nuclei having an angular momentum and a magnetic moment different from zero, this solvent consisting for instance of water (the atomic nuclei being then protons); and A paramagnetic substance dissolved in said solvent, the concentration of this paramagnetic substance being very low and non critical (it is generally present in the form of traces); this paramagnetic substance, which may be a metallic salt of a transition group or a free radical, is of the type having a stationary or bound hyperfine structure, that is to say it includes in its structure at least one unpaired electron in the S-state with respect to an atomic nucleus of the paramagnetic substances (this nucleus having also an angular momentum and a magnetic moment different from zero), the resonance line of this electron being narrow;

Said solution emitting, when one of the electronic resonance lines of the paramagnetic substance is saturated, energy at the frequency of the nuclear resonance line of said atomic nuclei in the magnetic field in which said solution is placed, this frequency being exactly proportional to the strength of said field for the reasons stated in the first mentioned patent application.

Among the solutions which may be adopted for providing a device capable of working as an auto-oscillator or maser, we may cite merely by way of example and without any given limitative character to this invention:

A solution of potassium or sodium nitrosodisulfonate in water, pyridine or formamide;
A solution of diphenyl-picrylhydrazyl in benzene or other organic solvents;
A solution of nitrosodisulfonate of tetraphenylstibonium in ether;
A solution of picryl-aminocarbazyl in benzene;
An aqueous solution of ions of a semiquinone such as $(O=C_6H_4-O)^-$.

(2) A high frequency circuit for saturating one of the electronic resonance lines of the paramagnetic substance, this high frequency circuit essentially including an oscillator 3 of very stable frequency, its frequency being for instance 55 MHz when it is desired to measure the earth magnetic field by means of an aqueous solution of nitrosodisulfonate; this oscillator has its output connected, through a coaxial cable 4 and a coaxial connection 5, to a tuned circuit including the high frequency coil 6 having a small number of turns of relatively thick wire, intended to saturate the electronic resonance line of the solution, and capacitors 7 and 8, the latter being the tuning capacitor of the high frequency circuit;

(3) A low frequency oscillating circuit including in particular a coil 9 having a great number of turns of fine wire and a tuning capacitor 10, this low frequency oscillating circuit having a very high Q factor, in such manner as to work as an auto-oscillator or maser on the nuclear resonance frequency of solution 2;

(4) An amplifier 11 and means, such as a frequency-meter 12 (for instance of the type disclosed in the above-mentioned prior patent applications) for accurately measuring the frequency of the energy collected by coil 9.

In order to avoid a coupling between the high frequency circuit and the low frequency circuit through their respective coils 6 and 9, we interpose between said coils, according to the main feature of the invention, an at least partly electricity conductive shield or screen 13 having substantially the shape of a cylinder of revolution slit or cut, on the one hand, along a generatrix and, on the other hand, along a plurality of planes substantially perpendicular to said generatrix, the conductive strips thus separated by these cuts being electrically connected between themselves and to the ground.

Such a shield may be made as shown by FIGS. 2 and 3.

We start from a solenoid 14, made of a wire of a conducting material such as copper or silver insulated by covering (for instance of cotton, silk, a superpolyamide designated by the trademark "NYLON") or by enamelling, this solenoid being equivalent to a series of wires or turns 15 which constitute essentially the above stated strips and extend in planes substantially perpendicular to the axis of a cylinder of revolution 16.

Said turns or wires are embedded in such a cylinder made for instance of a polyester resin and there is welded along a generatrix of the cylinder a conductive element or electrode 17 made of a wire of the same substance as that of solenoid 14, this conductor being intended to permit of grounding the shield during operation, as shown by FIG. 1.

Cylinder 16 is slit along a generatrix 18 opposed to the generatrix along which extends conductor 17. The whole is covered with a glass fabric impregnated with resin (e.g. a polyester resin) so as to obtain a homogeneous shield having the desired characteristics both from the electrical and the mechanical points of view. With such a construction, conductor 17 is located along a generatrix on which the electrical potential is the arithmetical mean of the potentials on the edges of the longitudinal slot along generatrix 18.

Shield 13, such as above described, is perfectly opaque at very high frequencies and transparent, without introduction of losses, at low frequencies, provided that the transverse dimensions of the wires which constitute turns 15 and conductor 17 are chosen greater than the depth of penetration for the highest frequency and much smaller than this depth for the lowest frequency brought into play in the device of FIG. 1 when container 1 is placed in the magnetic field to be measured. It should be reminded that the nuclear resonance frequency of protons is 4258 Hz. per gauss (that is to say about 2100 Hz. in the earth magnetic field) and that an electronic resonance frequency in a field equal to, or little different from, zero of the ions of nitrosodisulfonate is 55 MHz., so that there is no difficulty in making a shield of the above described type transparent, without losses, to the first of these frequencies and perfectly opaque to the second frequency.

This shield 13 prevents any substantial coupling between the high frequency and the low frequency circuits, thereby avoiding any error in the measurement of the nuclear frequency and reducing electric energy losses and consequently heating the vicinity of the high frequency coil 6.

We therefore dispose, as shown by FIG. 1, high frequency coil 6, capacitors 7 and 8 and connection 5 inside shield 13, the low frequency coil 9 being on the outside thereof and being preferably wound directly upon said shield 13, which constitutes its support. Thus, we have reduced to a value lower than 1% the influence of shield 13 upon the low frequency circuit containing coil 9.

On the other hand, owing to the fact that the heating in the vicinity of coil 6 is reduced, we may, in order to utilize in the best conditions the magnetic field created by this coil, dispose said coil, according to a further feature of this invention, inside container 1 so that it is immersed in solution 2 (as shown by FIG. 1), thereby increasing the coefficient of utilization of the high frequency magnetic field to saturate the electronic resonance line of the solution.

Coil 6 may for instance include only two turns and have its axis disposed at right angles to that of the high frequency coil 9. Connections 19 are provided between said coil 6 and the oscillator circuit, including capacitors 7 and 8, disposed inside frame 20.

Due to the fact that the field around the turns of coil 6 varies proportionally to the reciprocal of the distance to the axis 6a (in dot-and-dash lines) of the conductor or lead forming the turns of coil 20, this conductor is covered with a thick coating (averaging 5 mm. of radius) of a low loss dielectric substance, such as polyethylene, which reduces the losses by conduction in the liquid sheath which surrounds the conductor forming the turns of coil 6.

In a particular arrangement corresponding to that shown by FIG. 1, the simultaneous use of a shield 13 of the above described type (and illustrated by FIGS. 2 and 3) and of a high frequency coil disposed inside container 1 and covered with a layer of dielectric has made it possible to reduce from 20 watts to 5 watts the power necessary for saturating an electronic resonance line of an aqueous solution of nitrosodisulfonate, the heating of the solution having of course decreased in a corresponding manner due to the fact that a smaller amount of energy has been dissipated in the form of heat around the high frequency coil, fact which is favorable to stability of the paramagnetic substance.

In the particular case where the device, according to the invention, is intended to measure magnetic fields having an intensity liable to vary within a very wide range, it is of interest to use, for the low frequency circuit, the lay-out illustrated by FIG. 4. On this figure, the low frequency coil 9 of the probe of FIG. 1 and the tuning capacitor 10 with its two output terminals 10a have only been shown, the remainder of the probe being identical to the showing of FIG. 1.

Due to the fact that it is of interest to keep at a great distance from the frequency measuring electronic apparatus, that is to say from the frequency-meter connected to terminals 10a, the whole of the low frequency and high frequency coils, the connection between the low frequency coil 9 and the remainder of the low frequency apparatus is obtained by means of a coaxial cable 21. When the capacitance of this cable is important, it often becomes impossible to tune the low frequency circuit, which includes this cable, to a sufficiently wide range of frequencies which are proportional to the intensities of the magnetic field to be measured, by means of a mere conventional air capacitor located at 10.

To make it possible to tune the low frequency circuit to the frequencies within a wide range, according to another characteristic of the invention, we insert, between the output of cable 21 and variable capacitor 10, a high quality transformer 22 and we constitute coil 9 by a number of turns sufficiently low so that the capacitance necessary for tuning the low frequency circuit, within the range of working frequencies, is very great as compared to the capacitance of the connecting cable 21.

The step-up transformer 22, which has its primary winding $22_I$ connected with cable 21, has, across the terminals of its secondary winding $22_{II}$ (connected to variable capacitor 10), an apparent impedance equal to that of an inductance $n^2L$, if the $n$ designates the transformation ratio of the transformer and L the inductance of coil 9. We choose, as it can easily be done, the transformation ratio $n$ in such a manner that the value $n^2L$ corresponds to an inductance capable of being tuned by a variable air capacitor of conventional capacitance (for instance ranging from 500 to 1000 micromicrofarads) within the range of working frequencies, this capacitor being located at 10.

Of course, transformer 22 must be of very high quality (having for instance a quality factor Q of the order of magnitude of 1000) so as to obtain at the output of the transformer secondary a voltage as high as possible, this being necessary for sustaining the oscillations created by the energy collected by coil 9.

In order to fight against parasitic inductions, it is advantageous to provide a symmetrical arrangement by grounding, as shown, the middle point of coils or windings 9, $22_I$ and $22_{II}$ and also the shield of the coaxial cable.

Another advantage of the arrangement of FIG. 4 consists in the fact that it renders negligible the disturbances produced by connecting cable 21, in particular during transportation of the probe shown in cross-section on FIG. 1, because it is known that the mechanical stresses are capable of producing variations of the cable 21.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for measuring the intensity of magnetic fields in a range of intensities including the intensity of earth magnetic field, which comprises, in combination, a container, in this container a solution consisting of a solvent containing atomic nuclei having an angular momentum and a magnetic moment different from zero and of a paramagnetic substance having a hyperfine structure of the stationary type with at least one unpaired electron in S-state, said substance being dissolved in said solvent, whereby said solvent emits, when one of the electronic resonance lines of the paramagnetic substance is saturated, energy at the nuclear resonance frequency of said atomic nuclei, at least one high frequency coil disposed with respect to said container so as to create therein a magnetic field when electric energy is passed through said coil, means for supplying said high frequency coil with electric energy at the frequency of said electronic resonance line so as to saturate said line, at least one low frequency coil disposed with respect to said container in such manner as to collect said energy at the nuclear resonance frequency, electric circuit elements connected with said low frequency coil to constitute, at said nuclear resonance frequency, an oscillating circuit of high Q factor, means for measuring the frequency of the energy collected by said low frequency coil, an electric shield opaque to the transmission of energy at the frequency of said electronic resonance line but transparent to the transmission of energy at the nuclear resonance frequency, said electric shield being located between said low frequency coil and both said container and said high frequency coil, to prevent coupling between said coils although allowing said low frequency coil to collect said energy at the nuclear resonance frequency, and consisting of a tubular element at least a portion of which is made of an electricity conducting material, said element being provided on the one hand with a slot extending along a first generatrix and on the other hand with several slots respectively located in planes substantially perpendicular to said generatrix, and means for connecting the conducting strips thus insulated by said slots to the ground substantially along a second generatrix of said tubular element.

2. A device according to claim 1 in which said second generatrix is chosen so that its electrical potential is the arithmetical mean value of the potential on the edges of the longitudinal slot extending along the first mentioned generatrix.

3. A device for measuring the intensity of magnetic fields in a range of intensities including the intensity of earth magnetic field, which comprises, in combination, a container, in this container a solution consisting of a solvent containing atomic nuclei having an angular momentum and a magnetic moment different from zero and of a paramagnetic substance having a hyperfine structure of the stationary type with at least one unpaired electron in S-state, said substance being dissolved in said solvent, whereby said solvent emits, when one of the electronic resonance lines of the paramagnetic substance is saturated, energy at the nuclear resonance frequency of said atomic nuclei, at least one high frequency coil disposed with respect to said container so as to create therein a magnetic field when electric energy is passed through said coil, means for supplying said high frequency coil with electric energy at the frequency of said electronic resonance line so as to saturate said line, at least one low frequency coil disposed with respect to said container in such manner as to collect said energy at the nuclear resonance frequency, electric circuit elements connected with said low frequency coil to constitute, at said nuclear resonance frequency, an oscillating circuit of high Q factor, means for measuring the frequency of the energy collected by said low frequency coil, an electric shield opaque to the transmission of energy at the frequency of said electronic resonance line but transparent to the transmission of energy at the nuclear resonance frequency, said electric shield being located between said low frequency coil and both said container and said high frequency coil to prevent coupling between said coils although allowing said low frequency coil to collect said energy at the nuclear resonance frequency, and being constituted by a solenoid including a multiplicity of turns of a conducting wire, a linear conducting element welded to the turns of said solenoid along a generatrix thereof and connected to ground, a cylindrical insulating coating embedding said wire and said conductor element and forming a support for said solenoid, the whole being provided with a slot along a generatrix opposed to the first mentioned generatrix.

4. A device according to claim 3 in which the transverse dimension of the conducting wire forming the turns of said solenoid ranges between the depth of penetration of electrical energy in said cylinder at the nuclear resonance frequency and the depth of penetration of electrical energy in said cylinder at the electronic resonance frequency of said solution in the range of magnetic fields to be measured.

5. A device according to claim 1 in which the high frequency coil is located inside said container and immersed in said solution.

6. A device according to claim 5 in which the high frequency coil consists of a very small number of metallic turns covered by a coating of a low loss dielectric substance.

7. A device for measuring the intensity of magnetic fields in a broad range of intensities including the intensity of earth magnetic field, which comprises, in combination, a container, in this container a solution consisting of a solvent containing atomic nuclei having an angular momentum and a magnetic moment different from zero and of a paramagnetic substance having a hyperfine structure of the stationary type with at least one unpaired electron in S-state, said substance being dissolved in said solvent, whereby said solvent emits, when one of the electronic resonance lines of the paramagnetic substance is saturated, energy at the nuclear resonance frequency of said atomic nuclei, at least one high frequency coil disposed with respect to said container so as to create therein a magnetic field when electric energy is passed through said coil, means for supplying said high frequency coil with electric energy at the frequency of said electronic resonance line so as to saturate said line, at least one low frequency coil disposed with respect to said container in such manner as to collect said energy at the nuclear resonance frequency, a transmission coaxial cable connected to the output of said low frequency coil, a high quality transformer having a primary winding connected to the output of said cable, a conventional variable capacitor having its plates connected respectively with the terminals of the secondary of said transformer, said low frequency coil, coaxial cable, transformer and variable capacitor constituting a low frequency oscillating circuit of high Q factor tunable on the nuclear resonance frequency by means of said variable capacitor, means for measuring the frequency of the energy collected by said low frequency coil, an electric shield opaque to the transmission of energy at the frequency of said electronic resonance line but transparent to the transmission of energy at the nuclear resonance frequency, said electric shield being located between said low frequency coil and both said container and said high frequency coil, to prevent coupling between said coils although allowing said low frequency coil to collect said energy at the nuclear resonance frequency, and consisting of a tubular element at least a portion of which is made of an electricity conducting material, said element being provided on the one hand with a slot extending along a first generatrix and on the other hand with several slots respectively located in planes substantially perpendicular to said generatrix, and means for connecting the conducting strips thus insulated by said slots to the ground substantially along a second generatrix of said tubular element.

8. A device according to claim 7 in which the low frequency coil, the coaxial cable, the transformer and the variable capacitor of said low frequency oscillating circuit have a symmetrical arrangement relative to ground, realized by grounding the mid-point of said low frequency coil, the shield of said coaxial cable and the midpoint of said transformer.

References Cited in the file of this patent

Burgess et al.: Physical Review, vol. 100, No. 2, October 1955, pages 752 and 753.

Pipkin et al.: Physical Review, vol. 109, No. 5, March 1958, pages 1423 to 1439.

Perrin: Academie Des Sciences, Comptes Rendus, vol. 246, March 1958, pages 1833 to 1835.